Nov. 6, 1945.   T. E. MEAD   2,388,560
CONTROL VALVE
Filed May 8, 1942
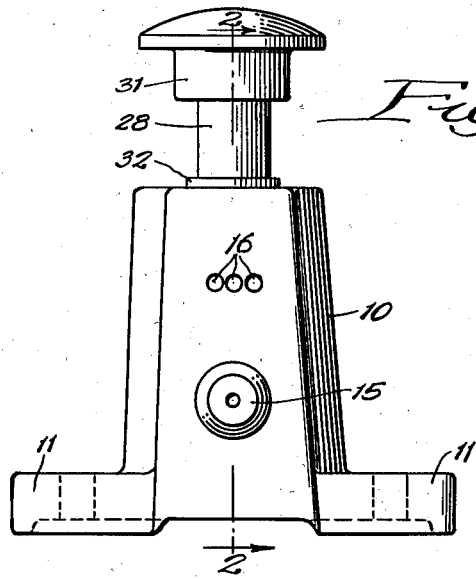
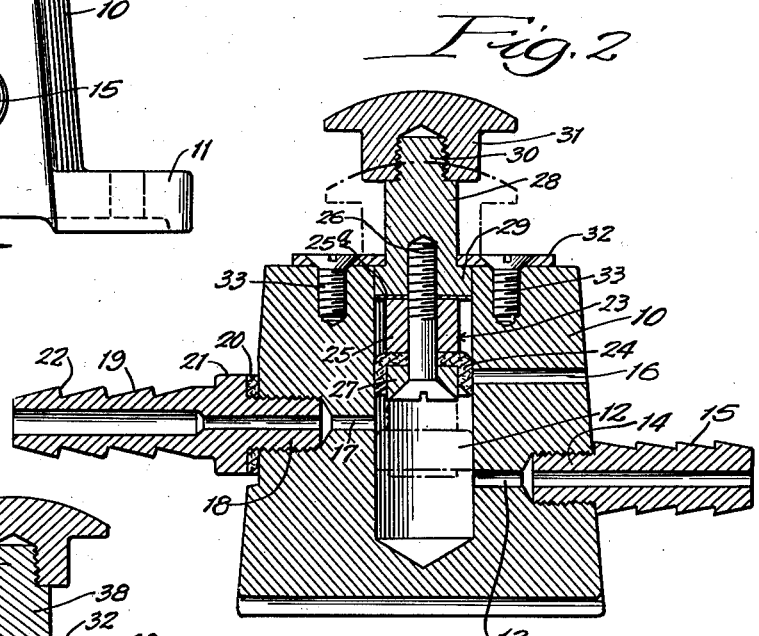
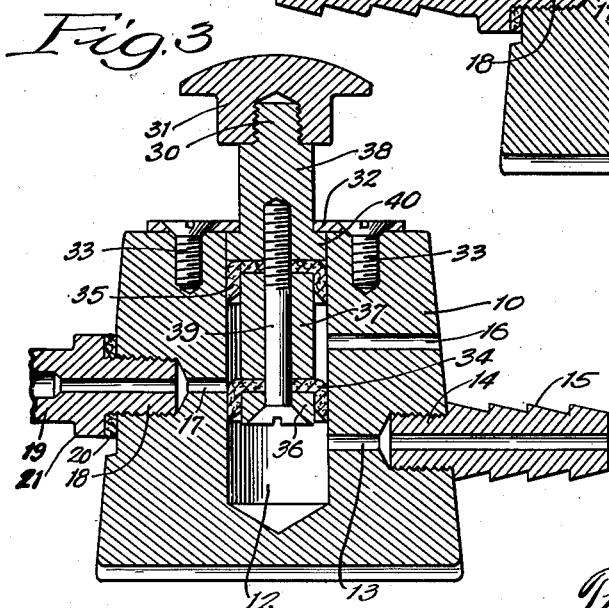
Inventor:
Theodore E. Mead,
By Dawson, Ooms & Booth,
Attorneys.

Patented Nov. 6, 1945

2,388,560

UNITED STATES PATENT OFFICE 2,388,560

CONTROL VALVE

Theodore E. Mead, Wilmette, Ill.

Application May 8, 1942, Serial No. 442,150

5 Claims. (Cl. 251—76)

This invention relates to a control valve adapted for use with a pressure fluid-operating and work-effecting cylinder. It is particularly useful in connection with a foot control valve.

An object of the present invention is to provide a valve structure of unusually simple and few parts which will effectively control the action of pressure fluid in driving a work cylinder etc. A further object is to provide a foot control valve consisting of very few parts and in which the valve structure will be automatically maintained in a desired position. Other specific objects and advantages will appear as the specification proceeds.

The invention is illustrated in a preferred embodiment, by the accompanying drawing, in which:

Figure 1 is an end view in elevation of apparatus embodying my invention; Fig. 2, a transverse sectional view, the section being taken as indicated at line 2 of Fig. 1; and Fig. 3, a view similar to that shown in Fig. 2 but of a modified structure.

In the illustration given in Figs. 1 and 2, 10 designates a casing member equipped at its base with outwardly-turned flanges 11, which are preferably perforated to receive bolts or other means for securing the casing to the floor or other supporting surface.

Within the casing block 10 and extending vertically from the top thereof is a valve passage 12, the lower portion of which terminates short of the bottom of the base so that the lower end of the passage is closed. Into the lower portion of passage 12 extends an inlet passage 13 through which a pressure fluid may be fed to the lower portion of the valve passage. The casing 10 is preferably provided with an enlarged and threaded opening aligned with opening 13 and adapted to receive the threaded attachment member 14. The attachment member 14 is provided with retaining shoulders 15 adapted to securely lock a rubber or elastic tube thereto, the tube (not shown) leading to a source of pressure fluid.

At a point spaced above the passage 13, there is formed a plurality of passages 16 through which the pressure fluid may be exhausted. Preferably, the passages 16 are small in diameter and located in parallel arrangement, as illustrated more clearly in Fig. 1. With this structure, a substantial discharge of fluid is permitted, while at the same time providing a minimum area into which the flexible valve cup may extend.

At an intermediate point between passages 13 and 16 is a pressure outlet passage 17. Aligned with the passage 17 is an enlarged and threaded recess receiving the threaded end 18 of the attachment fitting 19. Preferably, a sealing gasket 20 is provided between the casing wall and a shoulder 21 with which the fitting 19 is provided. Fitting 19 is also provided with retaining shoulders 22 adapted to secure a rubber or elastic tube thereto. The tube leads to a power cylinder or other mechanism to be operated by air or other fluid. Since such structures are well known, a description is not necessary herein.

Within the valve passage 12 is slidably mounted a valve stem 23 equipped with a flexible valve or cup 24. The valve stem may be constructed in any suitable manner. In the illustration given, the stem 23 comprises a central tube member 25 through which a screw 26 extends. The screw 26 extends through the leather or flexible cup seal 24 and urges a shoulder 27 against the member 24 so as to lock it firmly against the sleeve 25. The screw threadedly engages an upper member 28 so as to lock the sleeve 25 firmly thereto. If desired, a thin leather or flexible material washer 25ª may be employed between the sleeve 25 and the upper member 28 to prevent air leakage. The lower portion of the member 28 is provided with an integral shoulder 29, and the upper portion thereof is reduced and threaded at 30 and is adapted to engage a cap 31 or any other suitable device which may be employed for operating the valve stem 23. The lower portion of the cap 21 acts as a stop to limit the downward stroke of the piston so that the flexible cup seal will not be injured by being pressed against the bottom of the cylinder.

A plate 32 is centrally perforated to receive the member 28 and is secured to the casing 10 by means of screws 33.

In the operation of the device, pressure fluid enters through passage 13 and tends to maintain the valve 30 in its upper position, as shown in Fig. 2. In this position, the exhaust line 16 is closed and the pressure fluid extends through the outlet 17 and from thence to the power cylinder where work is accomplished. When it is desired to discontinue the operation of the work cylinder, the cap 31 may be urged downwardly so as to bring the valve 24 below the passage 17 and so as to close communication between passage 17 and inlet passage 13. In this position, the pressure fluid is free to exhaust through outlet 16 or through the upper portion of the piston chamber. If the cap 31 is released, the pressure fluid within the lower portion of the chamber automatically raises the valve piston to the position shown in Fig. 2 and the first cycle of operation heretofore described is repeated.

With the structure shown, it will be noted that a single sealing valve or piston 24 is required, a modicum of parts is employed, and the operation is substantially automatic except for the single downward stroke.

In the modification shown in Fig. 2, the structure is the same throughout except for the valve structure and stem. In this structure, two pistons or valves 34 and 35 are employed, the valve 34 being clamped between the washer 36 and the central sleeve 37, and the valve 35 being clamped between the sleeve member 37 and the upper stem member 38. A long screw 39 serves to lock the members 36, 37 and 38 together. The member 38 is also provided with a shoulder 40 which engages the plate 32 and thereby limits the upward stroke of the piston 38.

In the operation of the modification shown, the pressure fluid is normally inactive for operating the cylinder because of the sealing action of the lower flexible valve member 34, as illustrated in Fig. 3. When, however, the cap 31 is depressed so as to bring the valve member 34 below the inlet passage 13, the pressure fluid passes into the open space around the sleeve 37 and from thence through the passage 30 to the work cylinder. At the same time, the descent of valve member 35 closes off the exhaust passage 16. When the pressure upon the member 31 is released, the pressure fluid in the lower portion of the closed chamber causes the stem to rise automatically to the position shown in Fig. 3, with the shoulder 40 abutting the removable plate 32.

The arrangement of the exhaust openings 16 in a horizontal line enables a substantial amount of fluid to be exhausted rapidly while at the same time presenting very small areas against which pressure may be applied to the flexible cup 35. If a large opening were employed, the pressure of the exhausted fluid would tend to draw the lower portions of the cup into the opening and thereby distort it and interfere with the smooth operation of the device.

The valve stem in each of the structures is free to rotate and thus different portions of the flexible valve or cup are brought adjacent the exhaust openings and other openings.

The structure is extremely simple, involving a very small number of parts while at the same time affording quick and accurate operation, which for the most part is automatic.

While in the foregoing description, I have set forth many details and specific structures, it will be understood that such details and specific specifications may be modified widely without departing from the spirit of my invention.

I claim:

1. In a valve structure of the character set forth, a casing provided with a wide base and a vertical valve chamber open at its top but closed at its bottom, a stem movable vertically within said chamber, means carried by said stem and by said casing for limiting the upward movement of said stem, flexible valve means engaging the wall of said chamber and carried by said stem, a pressure inlet passage in the lower portion of said casing, an exhaust passage in the upper portion of said casing, and a pressure outlet passage adapted to lead to a work cylinder, said last-mentioned passage lying in a plane between said first-mentioned passages, said valve means extending across said chamber in sealing relation therewith and being movable in the chamber from a lower position wherein the valve means is disposed below said outlet and above said inlet whereby the exhaust and outlet passages are in communication to an upper position wherein said valve means is disposed above said inlet and outlet passages and extends below the exhaust passage whereby the inlet and outlet passages are in communication and the exhaust passage is not in communication with the other passages.

2. In a control valve structure of the character set forth, a casing providing a vertical valve chamber open at its top and closed at its bottom, a stem mounted within said chamber and guided for vertical movement, flexible valve means engaging the wall of said chamber and carried by said stem, a plate secured to said casing and having an opening therein adapted to receive a reduced portion of said valve stem, said plate thus limiting the upward movement of said valve stem, a fluid inlet passage communicating with the lower portion of said chamber, a fluid exhaust passage communicating with the upper portion of said chamber, and a fluid outlet passage in a plane lying between said passages and adapted to lead fluid to or from a work cylinder, said valve means extending across said chamber in sealing relation therewith and being movable in the chamber from a lower position wherein the valve means is disposed below the pressure outlet and above the inlet passage whereby the exhaust and outlet passages are in communication and to an upper position wherein said valve means is disposed above the outlet passage and extends below the exhaust passage whereby the inlet and outlet passages are in communication.

3. In a control valve structure of the character set forth, a casing providing a vertical valve chamber, a valve stem slidably mounted therein, a flexible cup seal mounted upon the lower portion of said stem only, a pressure fluid inlet communicating with the lower portion of the chamber, a pressure fluid outlet communicating with an intermediate portion of said chamber, and a plurality of small exhaust passages communicating with an upper portion of said chamber, said exhaust passages being arranged in a horizontal row, and the pressure in the lower portion of the chamber normally maintaining said seal and stem above said fluid inlet and above said fluid outlet to connect the latter and the inlet.

4. In a control valve structure of the character set forth, a casing provided with a wide base and affording a vertical cylinder therein and closed at the bottom, a pressure intake passage in said casing communicating with the bottom portion of said cylinder, an exhaust orifice in said casing and communicating with the upper portion of said cylinder, a pressure outlet passage between said first-mentioned passages and adapted to communicate with a work cylinder, a valve stem slidably mounted in said cylinder and provided with means for limiting the upward movement thereof and means for limiting the downward movement thereof, and a flexible valve carried by said valve stem and extending across said cylinder in airtight relation therewith, said limiting means establishing limits of movement for said valve between a lower position wherein the valve means is disposed below the pressure outlet passage and extends above the inlet passage whereby the exhaust and outlet passages are in communication and an upper position wherein said valve means is disposed above the outlet passage and extends below the exhaust passage whereby the inlet and outlet passages are in communication.

5. In a control valve structure of the character set forth, a casing providing a vertical chamber closed at the bottom and open at the top, a pressure fluid inlet passage communicating with the lower portion of the chamber, a pressure fluid outlet passage communicating with an intermediate point of the chamber and adapted to lead to an operating cylinder, and an exhaust passage communicating with the upper portion of said chamber, a valve stem mounted in said chamber for sliding movement, a shoulder carried by said valve stem, means carried by said casing and engaging said shoulder to limit upward movement of said stem, and a single valve carried by said stem, said valve closing said exhaust passage and remaining above said first-mentioned passages when no downward pressure is exerted upon said valve stem.

THEODORE E. MEAD.